United States Patent [19]

Karp

[11] Patent Number: 4,957,400
[45] Date of Patent: Sep. 18, 1990

[54] PICKUP TRUCK PADS FOR CARRYING LONG LOADS

[76] Inventor: John D. K. Karp, 15 Cornswamp Rd., York, Me. 03909

[21] Appl. No.: 337,291

[22] Filed: Apr. 13, 1989

[51] Int. Cl.$^5$ .................... B65D 63/00; B62D 33/00; B60R 9/04
[52] U.S. Cl. .................... 410/110; 224/309; 296/39.1
[58] Field of Search ............ 410/88, 87, 90, 85, 410/97, 99, 110, 115; 296/50, 57.1, 39.1, 39.2; 224/42.03 R, 42.04, 309, 318, 322, 324; 248/499, 503

[56] References Cited

U.S. PATENT DOCUMENTS

| | | | |
|---|---|---|---|
| 3,884,404 | 5/1975 | Frost | 248/499 X |
| 4,011,632 | 3/1977 | MacDonald | 410/99 |
| 4,483,471 | 11/1984 | Prosen | 224/309 X |
| 4,515,233 | 5/1985 | Silverstein | 410/99 X |
| 4,630,990 | 12/1986 | Whiting | 410/101 X |

OTHER PUBLICATIONS

J. C. Whitney and Company Catalog, Catalog No. 483 K, June 1987, p. 57.

Primary Examiner—Robert J. Oberleitner

[57] ABSTRACT

A set of pickup truck protective pads for carrying long loads comprises a cab pad and a tail gate pad both of a configured elastomeric foam having preferably a tough skin or cover. The cab pad has generally a right angle shape in cross section and a beveled leading edge and the tail gate pad has generally a U-shaped cross section. Each pad has a hold down strap with clips on either side to secure it to the truck.

5 Claims, 4 Drawing Sheets

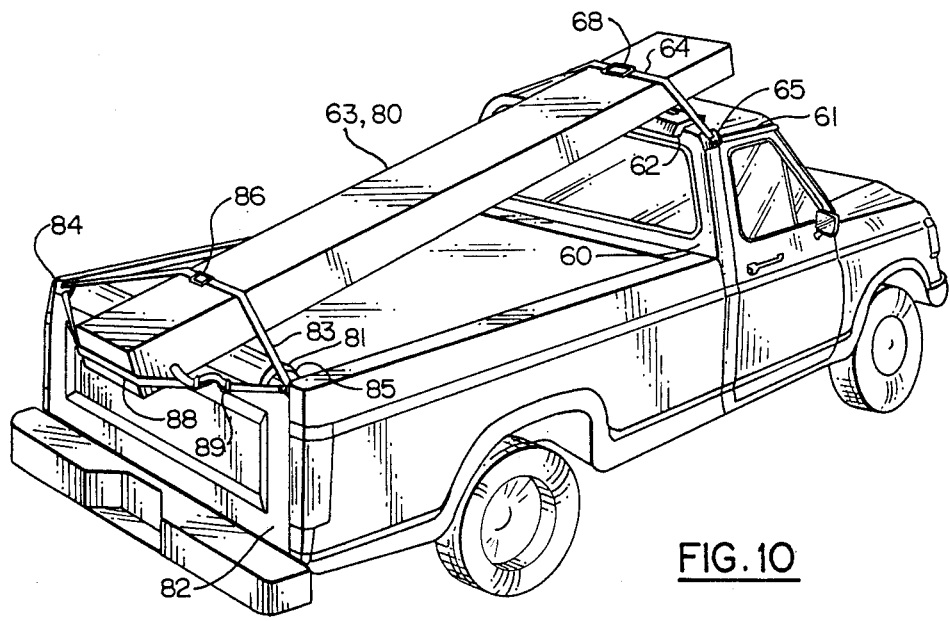
FIG. 10
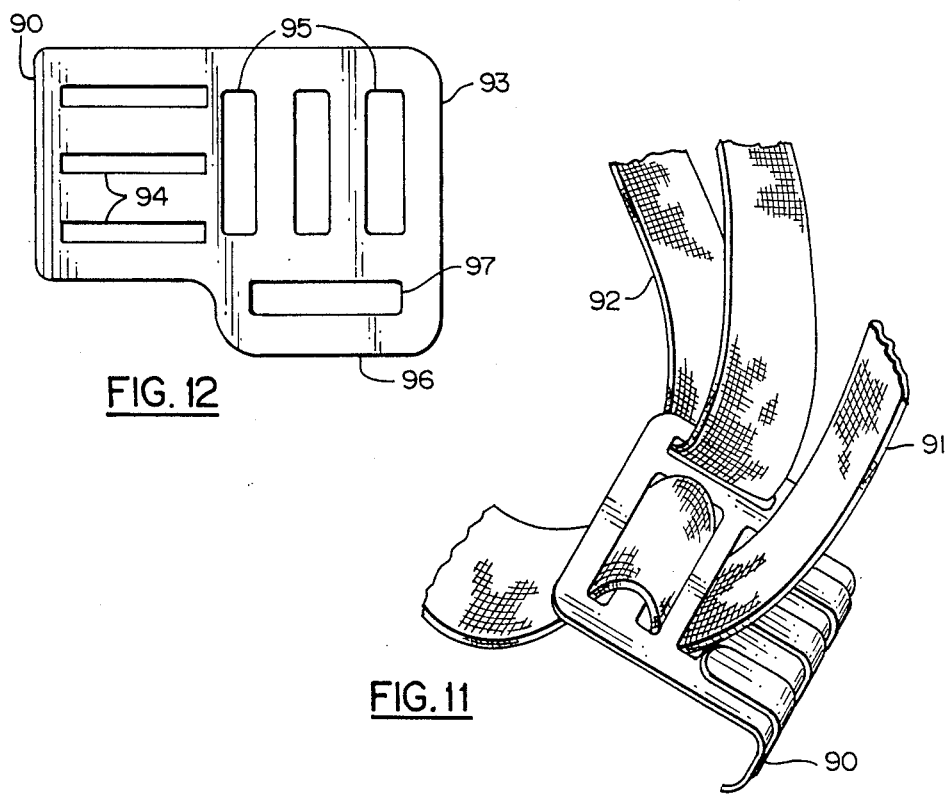
FIG. 12
FIG. 11

PICKUP TRUCK PADS FOR CARRYING LONG LOADS

The present invention is a set of configured pads for a pickup truck to protect the cab and tailgate when the truck is used to carry long loads. This invention encompasses the pads themselves and the hold down straps and clips associated therewith.

BACKGROUND

Pickup trucks are often used to carry long loads that span the truck bed from the cab to the tailgate. Typical of such loads are lumber, canoes, surfboards, boats and poles If no padding is placed between the cab and the load and between the tailgate and the load either or both the truck body and the load will be scarred, marred or otherwise damaged in some fashion. This is particularly true if the same object is repeatedly carried, such as a kayak. When padding such as rags or newspaper is used, the padding often proves to be unsatisfactory in that it slips or falls out of place because of the vibration of the moving vehicle. It is difficult to secure such padding in place without taping it or tying it on to the long load in some manner. Many sportsmen buy "beefed up" pickup trucks and are quite proud of them. They have no desire to see them scarred or the finish marked up.

There has been need therefore for protective pads for pickup trucks that can readily be placed on and secured to the truck to permit the truck to carry long loads without damaging either the truck or the load. The present invention is addressed to this desideratum.

THIS INVENTION

The present invention is a set of protective configured load carrying pads designed to be fitted to the upper rear edge of the truck cab and to the top of the tail gate and secured with straps and clips that come attached to the pads. The design of the pads are such that they can be placed together and conveniently stored behind the seat in the cab of the truck to be readily available as needed.

In brief compass the present invention is a set of protective configured load carrying pads comprising a cab pad and a tailgate pad. The cab pad is a molded plastic elastomeric foam, generally having a right angle shape in cross section, configured to fit the upper rear edge of the cab of a pickup truck and having a strap over its length to secure it to the cab, this being done by means of clips that attach either to the rain gutter or to the door well. The tailgate pad comprises a molded plastic foam part generally U shaped in cross section and configured to fit the upper edge of the tailgate t too has a strap to secure it to the tailgate, the strap passing through clips that engage the upper ends of the tailgate. Preferably the pads arc molded to have at each end recesses on the underside through which the securing strap can be passed by means of slit from the upper side of the pad to the recess.

It is preferred that the plastic foam pads have an outer skin of a fabric or of a high density plastic adhered thereto both to strengthen and reinforce the surface contacting the load and for purposes of appearance. This outer surface can have a non-slip configuration of some type molded into it to help prevent sliding of the long load thereover. A tough protective skin can be obtained by causing a higher density layer of the foam to form at the outer surface of the pad as by chilling that portion of the mold. A higher density foam outer layer can be laminated to a lower density core.

While the cab and tailgate pads can be single units, a preferred embodiment is to use two cab pads and two tailgate pads of lesser width, held down by a common strap for each which may make the pads more convenient to store as the stored length will be less.

THE DRAWINGS

In the drawings:

FIG. 7 is a cross sectional view taken along line C—C of FIG. 6;

FIG. 10 is a perspective view of a pick up truck carrying the long load as shown in FIGS. 6,7,8 and 9, the same part shown in FIGS. 6,7,8, 9 and 10 having the same number in each drawing;

FIG. 11 is a perspective view of the clip used in this invention showing the straps in place; and FIG. 12 is a view of the clip as stamped from a sheet of metal.

DESCRIPTION

Figure 1:
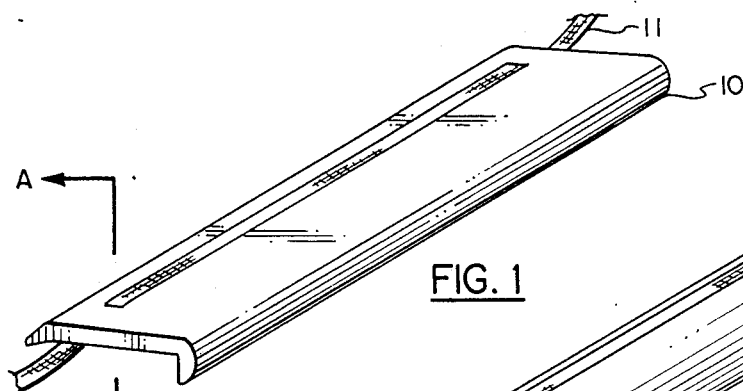
FIG. 1 is a perspective view of a cab pad of this invention.

Referring to FIG. 1, a cab pad consists of a molded foam member 10 configured to generally fit the curvature of the upper rear edge of a pickup cab. Laced through the ends of pad 10 and over the top thereof is a pull down strap 11.

Figure 2:
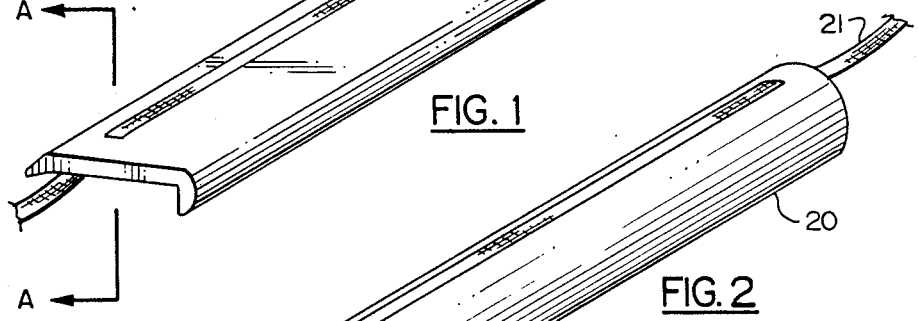
FIG. 2 is a perspective view of a tailgate pad.

FIG. 2 illustrates a tailgate pad of a molded foam 20 having a hold down strap 21 laced therethrough in the same manner as strap 11 in FIG. 1.

Any suitable resilient tough foam may be used to make the pads of this invention, such as a polyurethane, polypropylene or polyethylene foam. Generally the foam will have a density in the range of 1.5 to 5.5 pounds per cubic foot a tensile strength of 33 to 110 pounds per square inch, and elongation to break of 100 to 196 percent, and a compression set at 50 percent deflection in the range of 12 to 28 percent.

Figure 3:
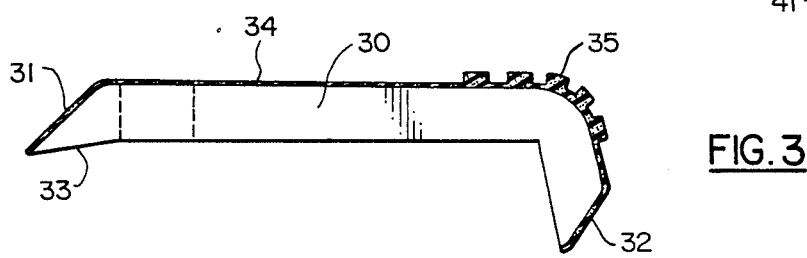
FIG. 3 is a cross sectional view of a cab pad similar to the one shown in FIG. 1.

In FIG. 3 shown in cross section is a cab pad 30 similar to the cab pad shown in FIG. 1. It has a beveled leading edge 31 facing the wind when the truck is in motion and a beveled trailing edge 32 which is more for appearance than function. The leading edge 31 has a slight downturn or cant as indicated at 33 so that the nose is squeezed tightly against the top of the cab. In this embodiment, the pad has a tough outer protective layer 34 adhesively secured or flame laminated to it. The outer layer can have molded longitudinal ribs 35 to help prevent the load from slipping This layer may be a fabric such as a canvas or can be a plastic skin such as a vinyl skin.

Figure 4:
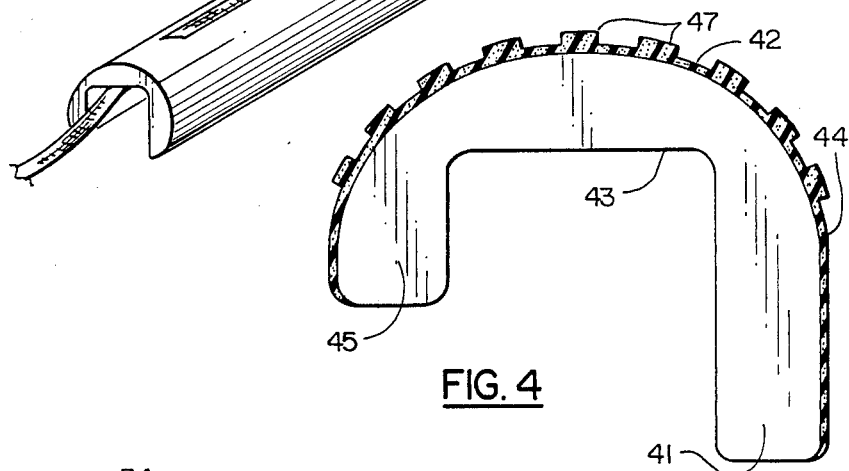
FIG. 4 is a cross sectional view of a tailgate pad similar to the one shown in FIG. 2.

In FIG. 4 a cross section of a pad similar to that illustrated in FIG. 2 is shown. As can be seen, this tailgate pad 41 has a rounded upper surface 42 and a configured U-shaped interior surface 43 to fit over the upper edge of a tailgate. In this embodiment, the pad has a tough outer skin 44, which can be a thermoformed skin having ribs 47 that run longitudinally along the pad which ribs have some reinforcing effect and also help prevent the load from sliding over the tailgate pad.

Figure 5:
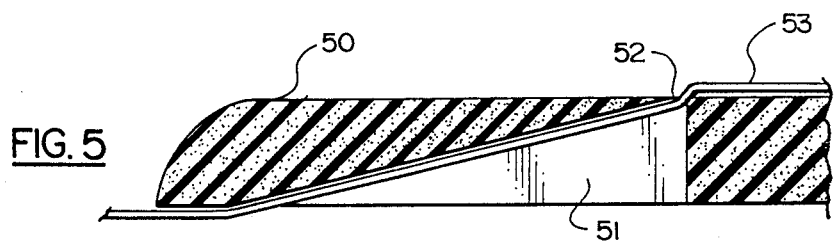
FIG. 5 is an enlarged cross section taken along line A—A of FIG. 1 showing the recess provided for the hold down strap.

Turning to FIG. 5, in this enlarged cross section taken along line A—A of FIG. 1, a method of affixing the strap to the molded pad is shown A recess 51 is molded into the underside of the end of the pad 50. It terminates in a knife slit 52 at the top of the pad. The hold down strap 53 is threaded through the knife slit down through the recess 51 and out under the edge of the pad as shown.

Figure 6:
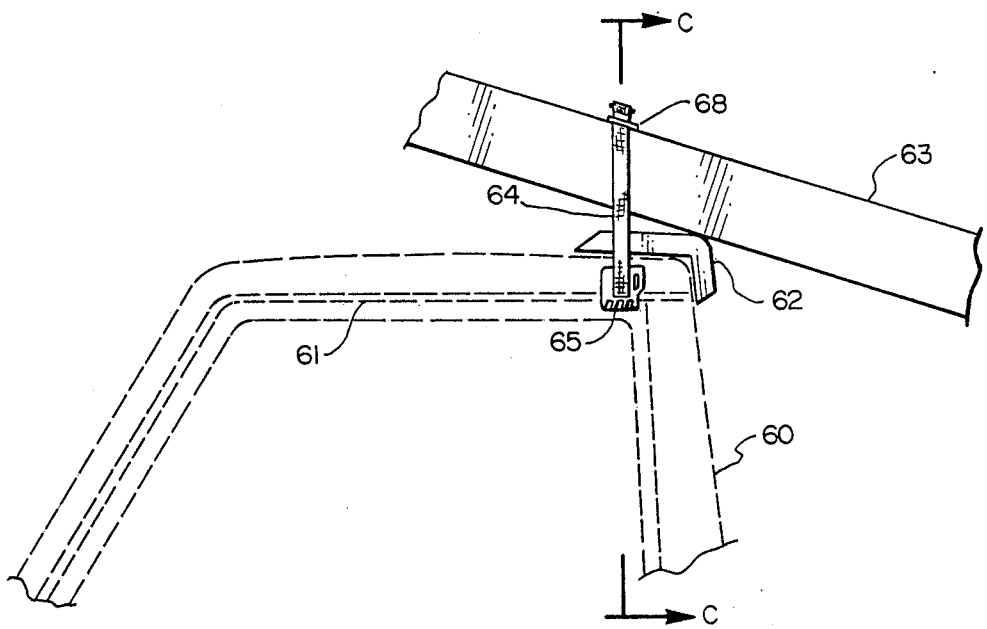
FIG. 6 is a side view of a cab pad and a load tied down thereon.

In the embodiment shown in FIGS. 6 through 10, FIG. 6 illustrates the upper part of a pickup truck cab body 60 having an external rain gutter 61 on the left side and an internal one 66 on the right side. The cab pad of this invention is shown at 62. Placed on top thereof is a load 63 such as a pile of lumber. A cross sectional view taken along line C—C of FIG. 6 is shown in FIG. 7.

The hold down strap 64 passes over the top of pad 62 and down through the ends thereof as illustrated in FIG. 5 to clips 65 and 67 gripping the rain gutters 61 and 66 respectively. Strap 64 continues through the clips and up over the load 63 through a hold down buckle 68. This helps to secure the load. The length of the strap 64 can be such that it can be wound one or more times around the load before being secured by buckle 68.

Figure 8:
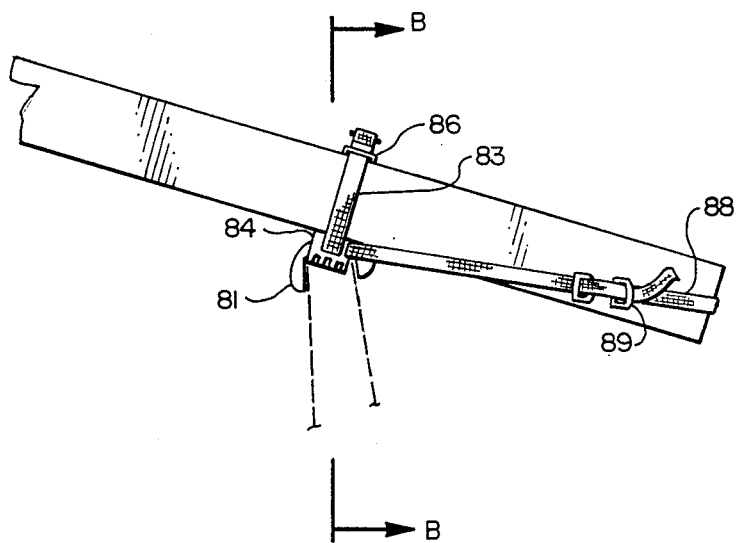
FIG. 8 is a side elevation view of a tailgate pad with a load secured thereon.
Figure 9:
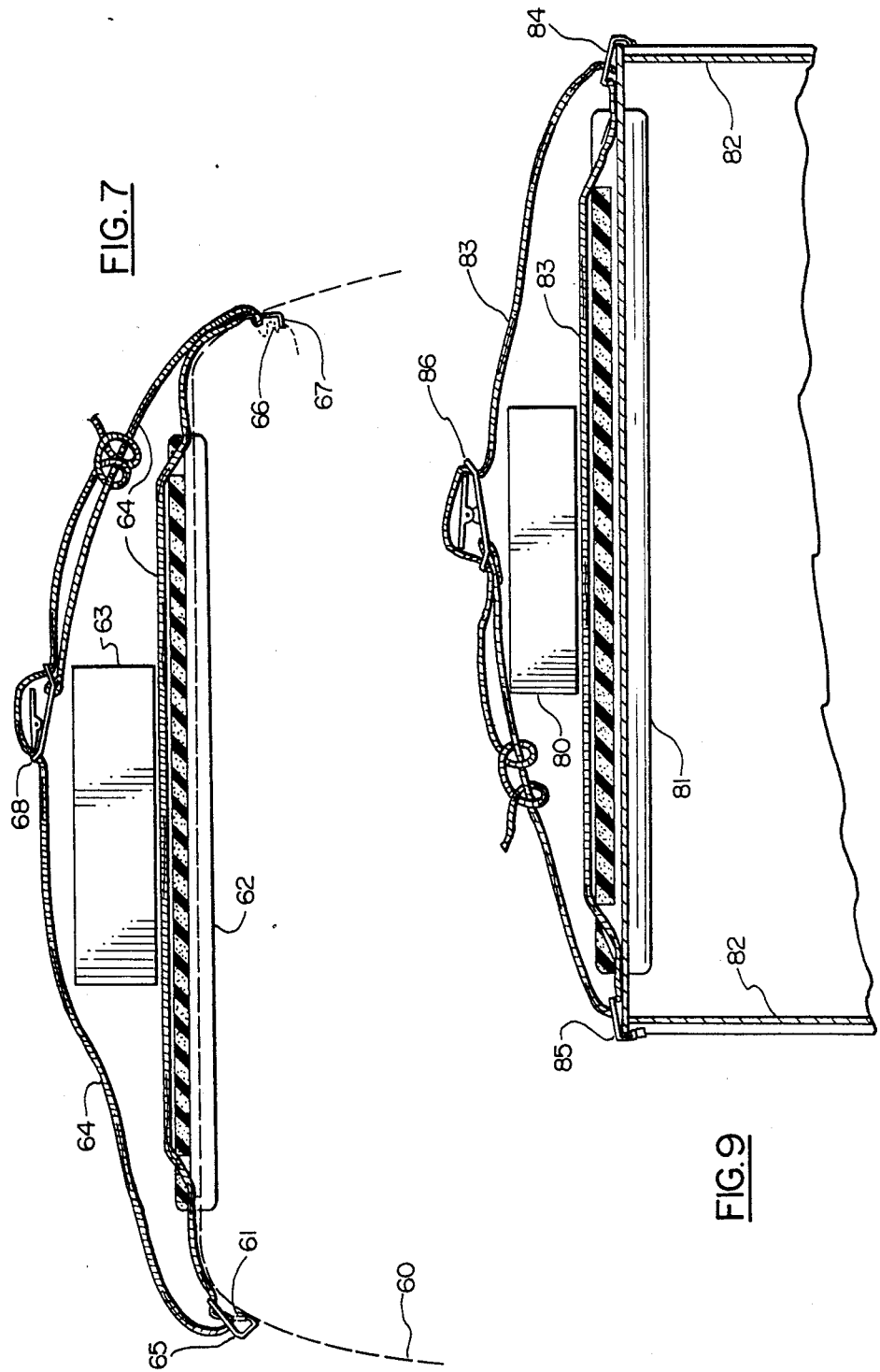
FIG. 9 is a cross sectional view taken along line B-B of FIG. 8.

A tailgate pad holding down the same load as in FIG. 6 is illustrated in FIGS. 8 and 9. Shown is the load 80 and the tailgate pad 81 over the upper edge of a tailgate The outline of which is shown at 82. A hold down strap 83 passes over the top of pad 81 and down through the ends thereof to clips 84 and 85 which engage the upper ends of the tailgate. As in the case of the cab pads shown in FIGS. 6 and 7, the strap continues through the clips, up over the load and is secured with a buckle or holder 86.

The front and rear clips (65 and 84, 67 and 85) on one side of the truck are identical while the right and left clips (65 and 67, 84 and 85) are mirror images of one another.

Illustrated in FIG. 8 is an embodiment wherein the clips 84 and 85 are provided with an extra slot so that a rearward extending strap 88 can be passed therethrough and around the end of the load to help secure the load against sliding, buckle 89 being used to hold the strap in place under tension.

It is contemplated that the cab and tailgate pads will be sold as a set with a suitable cloth or plastic container or bag that permits them to be stored together behind the seat of the cab of a pickup truck. If only one cab pad and one tailgate pad is provided, they will preferably have a length in the order of 40 to 48 inches, e.g. 44 inches. For convenience of storage, however, there can be two cab pads and two tailgate pads to a set, each of which has a length no greater than one third the width of the tail gate. Thus the user, if only a narrow long load is to be carried can use only one each of the cab pads and the tailgate pads to carry the load. If the load is wide, however, such as a sheet of plywood or a scaffolding then the full set of the two cab pads and the two tailgate pads could be used to protect the edges of the truck.

While the straps are shown as passing over the top portion of the pads, it is within the scope of this invention to have the hold down straps pass through the central portion of the foam of the pads through a suitable channels cored therein.

FIGS. 11 and 12 illustrate the clip of this invention in greater detail. The same part has the same number throughout the three drawings. A clip 93 as stamped from a sheet metal is shown in FIG. 12. It is characterized by having three parallel coined reinforcing ribs 94 perpendicular to the curved lip 90 that is bent over to engage the rain gutters and tail gate. Perpendicular to slots 94 are three parallel slots 95 to receive the webbing 91 that passes over the load (corresponding to webbing 64 and 83 in FIG. 10). A tongue of metal to one side of slot 95 has another slot 97 perpendicular to slots 95 to receive the strap 92 that may be used to pass around behind the load (corresponding to strap 88 in FIG. 10).

For example the clip can be stamped from a 16 gauge low carbon steel. The width of lip 90 can be 1.5 inches and the length of the clip prior to bending can be 2.6 inches. Ribs 94 can be 0.25 inches wide and coined to a depth of 0.05 inches. The lip 90 is bent around to a depth of 0.63 inches, with ribs 94 being on tip of the bend. After being formed the clips are preferably coated with a poly vinyl chloride resin in a known manner.

Having described this invention what is sought to be protected by Letters Patented is simply set forth in the following claims.

What is claimed is:

1. Protective configured load carrying elastomeric foam plastic pads for a pickup truck comprising, as a set:
   a cab pad comprising a configured elastomeric foam generally having a right angle shape in cross section an configured to fit the upper rear edge of the cab of a pickup truck and having a strap to secure it to said cab;
   a tail gate pad comprising a configured elastomeric foam generally U shaped in cross section and configured to fit the upper edge of the tailgate of said pickup truck and having a strap to secure it to said tailgate;
   clips held by said straps on either side of said pads, said clips serving to secure the pads to the vehicle and
   said straps extending beyond said clips a substantial length, permitting the straps to be secured over and hold a load resting on said pads.

2. The pads of claim 1 wherein said clips have means permitting a tie down to be fastened thereto and to extend rearedly to secure the end of a long load.

3. The pads of claim 1 wherein said pads have a skin of a higher density plastic layer adhesively secured to said configured elastomeric foam, said higher density plastic layer having a slip resistant configured outer surface against which the load rests.

4. The pads of claim 1 wherein the leading edge of said cab pad is beveled and canted downwardly.

5. Protective configured load carrying elastomeric foam plastic pads for a pickup truck comprising, as a set:
   a cab pad comprising a configured elastomeric foam generally having a right angle shape in cross section and configured to fit the upper rear edge of the cab of a pickup truck and having a strap to secure it to said cab, and
   a tail gate pad comprising a configured elastomeric foam generally U shaped in cross section and configured to fit the upper edge of the tailgate of said pickup truck and having a strap to secure it to said tailgate, said straps passing over the top and down through the outer edges of said pads and openings provided therein and thence to clips to assist fastening of the pads to the vehicle.

* * * * *